United States Patent
Turaga et al.

(10) Patent No.: US 7,526,025 B2
(45) Date of Patent: Apr. 28, 2009

(54) LIFTING-BASED IMPLEMENTATIONS OF ORTHONORMAL SPATIO-TEMPORAL TRANSFORMATIONS

(75) Inventors: Deepak S. Turaga, Elmsford, NY (US); Rohit Puri, San Jose, CA (US); Ali J. Tabatabai, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 946 days.

(21) Appl. No.: 10/971,896

(22) Filed: Oct. 22, 2004

(65) Prior Publication Data

US 2005/0117638 A1 Jun. 2, 2005

Related U.S. Application Data

(60) Provisional application No. 60/514,342, filed on Oct. 24, 2003, provisional application No. 60/514,351, filed on Oct. 24, 2003, provisional application No. 60/518,135, filed on Nov. 7, 2003, provisional application No. 60/523,411, filed on Nov. 18, 2003.

(51) Int. Cl.
*H04N 7/12* (2006.01)
(52) U.S. Cl. ............... 375/240.12; 375/240; 375/240.01
(58) Field of Classification Search .................. 375/240, 375/240.01, 240.12, 240.16, 240.18; 382/232
See application file for complete search history.

(56) References Cited

U.S. PATENT DOCUMENTS

| | | | |
|---|---|---|---|
| 5,398,078 A | 3/1995 | Mausda et al. | |
| 5,621,660 A | 4/1997 | Chaddha et al. | |
| 5,661,822 A | 8/1997 | Knowles et al. | |
| 5,841,909 A | 11/1998 | Yokoyama | |
| 5,946,419 A | 8/1999 | Chen et al. | |
| 6,122,320 A | 9/2000 | Bellifemine et al. | |
| 6,381,276 B1 | 4/2002 | Pesquet-Popescu | |
| 6,381,279 B1 * | 4/2002 | Taubman ............... | 375/240.18 |
| 6,430,317 B1 | 8/2002 | Krishnamurthy et al. | |
| 6,473,528 B2 * | 10/2002 | Li et al. ..................... | 382/232 |
| 6,628,714 B1 * | 9/2003 | Fimoff et al. .......... | 375/240.16 |
| 2003/0202598 A1 | 10/2003 | Turaga et al. | |

OTHER PUBLICATIONS

Choi, Seung-Jong, et al., "Motion-Compensated 3-D Subband Coding Of Video", IEEE Transactions On Image Processing, vol. 8, No. 2, Feb. 1999, pp. 155-167.
Somasundaram, Siva, et al., "A Novel 3D Scalable Video Compression Algorithm", IS&T/SPIE Electronic Imaging, Image and Video Communications and Processing, Santa Clara, Jan. 2003, 7 pages.
Wu, Yongjun, et al., "Recent Improvements In The MC-EZBC Video Coder", International Organisation For Standardisation ISO/IEC JTC1/SC29/WG11, Coding Of Moving Pictures And Audio, Hawaii, U.S.A., Dec. 2003, 13 pages.

* cited by examiner

*Primary Examiner*—Allen Wong
(74) *Attorney, Agent, or Firm*—Blakely, Sokoloff, Taylor & Zafman LLP

(57) ABSTRACT

A method and apparatus for encoding video frames is described. In one embodiment, an encoding method includes jointly transforming a set of pixels into high-pass data using an orthonormal transform. The set of pixels includes at least one reference pixel and predicted pixels. The method further includes generating low-pass data using the reference pixel and the high-pass data.

13 Claims, 9 Drawing Sheets

| M | A | B | C | D |
|---|---|---|---|---|
| I | $X_1$ | | | |
| J | $X_2$ | | | |
| K | $X_3$ | | | |
| L | $X_4$ | | | |

LIFTING-BASED IMPLEMENTATIONS OF ORTHONORMAL SPATIO-TEMPORAL TRANSFORMATIONS

RELATED APPLICATIONS

This application is related to and claims the benefit of U.S. Provisional Patent application Ser. Nos. 60/514,342 filed Oct. 24, 2003, 60/514,351 filed Oct. 24, 2003, 60/518,135 filed Nov. 7, 2003 and 60/523,411 filed Nov. 18, 2003, which is hereby incorporated by reference.

FIELD OF THE INVENTION

The invention relates to video compression in general. More particularly, the invention relates to spatio-temporal transformations in video coding.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2004, Sony Electronics, Inc., All Rights Reserved.

BACKGROUND OF THE INVENTION

A number of the current video coding algorithms is based on motion compensated predictive coding schemes. In such schemes, temporal redundancy is reduced using motion compensation, while spatial redundancy is reduced by transform coding the residue of motion compensation. One component of motion compensated predictive coding schemes is motion compensated temporal filtering (MCTF), which is performed to reduce temporal redundancy.

MCTF typically includes filtering frames temporally in the direction of motion. MCTF may be combined with a spatial transform (e.g., wavelet or discrete cosine transform (DCT)) and entropy coding to create the encoded bitstream.

During the temporal filtering, some pixels may either be not referenced or referenced multiple times due to the nature of the motion in the scene and the covering/uncovering of objects. Not referenced pixels are known as unconnected pixels, and pixels referenced multiple times are known as multiply connected pixels. Processing of unconnected pixels by traditional MCTF algorithms typically requires special handling, which leads to reduced coding efficiency. In the case of multiply connected pixels, traditional MCTF algorithms typically achieve the overall temporal transformation as a succession of local temporal transformations, which destroys the orthonormality of the transformation, resulting in quantization noise propagation effects at the decoder.

SUMMARY OF THE INVENTION

A method and apparatus for encoding video frames is described. An exemplary encoding method includes jointly transforming a set of pixels into high-pass data using an orthonormal transform. The set of pixels includes at least one reference pixel and predicted pixels. The method further includes generating low-pass data using the reference pixel and the high-pass data.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4 illustrates an exemplary intra-prediction process.

DETAILED DESCRIPTION OF THE INVENTION

In the following detailed description of embodiments of the invention, reference is made to the accompanying drawings in which like references indicate similar elements, and in which is shown, by way of illustration, specific embodiments in which the invention may be practiced. These embodiments are described in sufficient detail to enable those skilled in the art to practice the invention, and it is to be understood that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
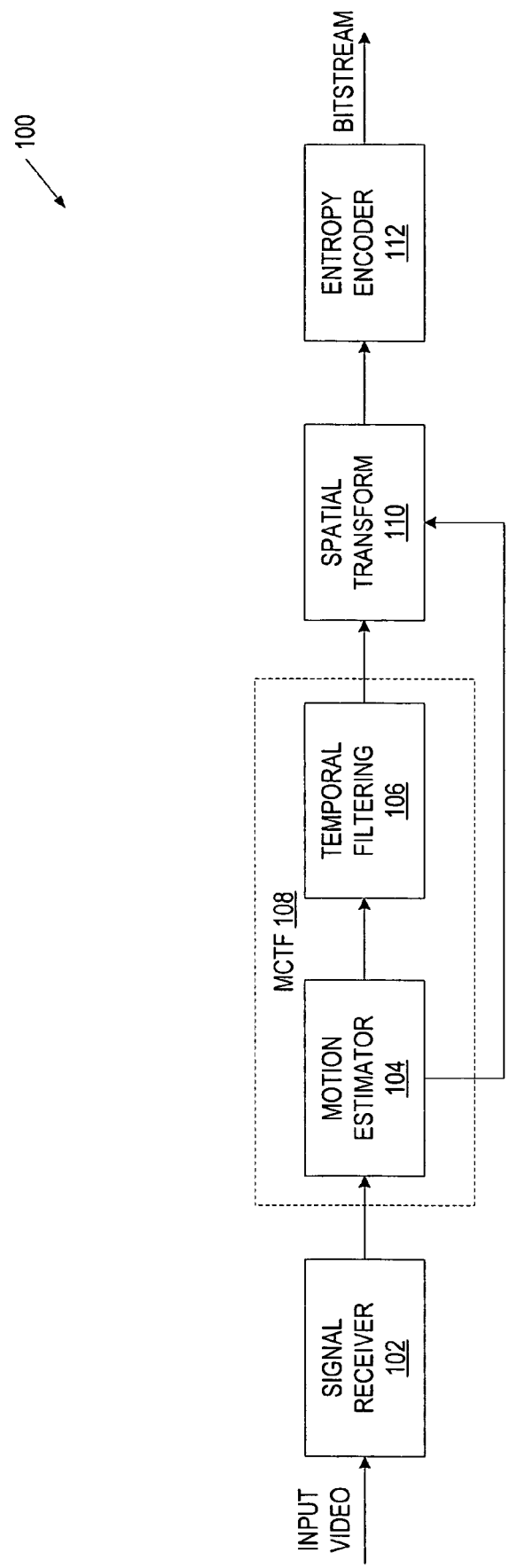
FIG. 1 is a block diagram of one embodiment of an encoding system.

Beginning with an overview of the operation of the invention, FIG. 1 illustrates one embodiment of an encoding system 100. The encoding system 100 performs video coding in accordance with video coding standards such as Joint Video Team (JVT) standards, Moving Picture Experts Group (MPEG) standards, H-26× standards, etc. The encoding system 100 may be implemented in hardware, software, or a combination of both. In software implementations, the encoding system 100 may be stored and distributed on a variety of conventional computer readable media. In hardware implementations, the modules of the encoding system 100 are implemented in digital logic (e.g., in an integrated circuit). Some of the functions can be optimized in special-purpose digital logic devices in a computer peripheral to off-load the processing burden from a host computer.

The encoding system 100 includes a signal receiver 102, a motion compensated temporal filtering (MCTF) unit 108, a spatial transform unit 110, and an entropy encoder 112. The signal receiver 102 is responsible for receiving a video signal with multiple frames and forwarding individual frames to the MCTF unit 108. In one embodiment, the signal receiver 102 divides the input video into a group of pictures (GOP), which are encoded as a unit. The GOP may include a predetermined number of frames or the number of frames in the GOP may be determined dynamically during operation based on parameters such as bandwidth, coding efficiency, and the video content. For example, if the video consists of rapid scene changes and high motion, it is more efficient to have a shorter GOP, while if the video consists of mostly stationary objects, it is more efficient to have a longer GOP.

The MCTF unit 108 includes a motion estimator 104 and a temporal filtering unit 106. The motion estimator 104 is responsible for performing motion estimation on the received frames. In one embodiment, the motion estimator 104 matches groups of pixels or regions in the frames of the GOP to similar groups of pixels or regions in other frames of the same GOP. Therefore, the other frames in the GOP are the reference frames for each frame processed.

In one embodiment, the motion estimator 104 performs backward prediction. For example, groups of pixels or regions in one or more frames of the GOP may be matched to similar groups of pixels or regions in one or more previous frames of the same GOP. In this example, the previous frames in the GOP are the reference frames for each frame processed.

In another embodiment, the motion estimator 104 performs forward prediction. For example, groups of pixels or regions in one or more frames of the GOP may be matched to similar groups of pixels or regions in one or more proceeding frames of the same GOP. In this example, the proceeding frames in the GOP are the reference frames for each frame processed.

In yet another embodiment, the motion estimator 104 performs bi-directional prediction. For example, groups of pixels or regions in one or more frames of the GOP may be matched to similar groups of pixels or regions in both previous and proceeding frames of the same GOP. In this example, the previous and proceeding frames in the GOP are the reference frames for each frame processed.

As a result of the above described matching, the motion estimator 104 provides a motion vector and identifies sets of similar pixels or blocks to the temporal filtering unit 106. A set of similar pixels or blocks includes one or more reference pixels or blocks from one or more reference frames and one or more predicted pixels or blocks in a frame being predicted.

In one embodiment, the motion estimator 104 may not find good predictors in the reference frame(s) for some blocks or pixels in the predicted frame. Such pixels are referred to as unconnected pixels. Examples of connected, unconnected and multiply connected pixels are illustrated in FIG. 2.

Figure 2:
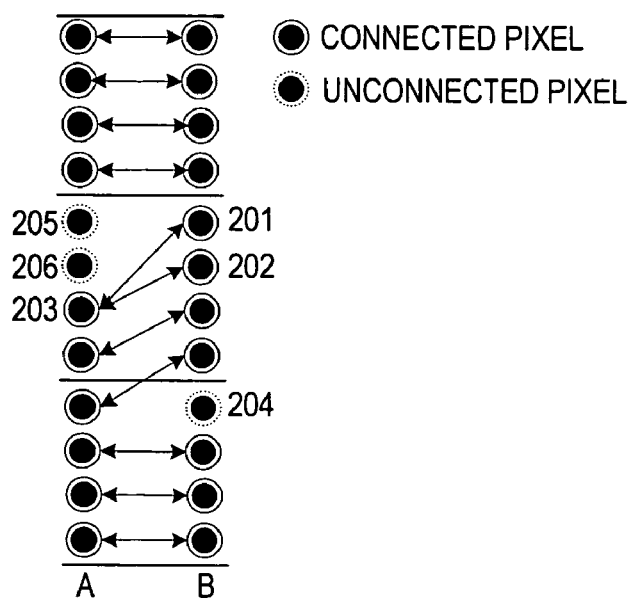
FIG. 2 illustrates exemplary connected, unconnected and multiply connected pixels.

Referring to FIG. 2, frame A is a reference frame and frame B is a frame being predicted. Pixels 201, 202 and 203 are multiply connected pixels. Pixels 204, 205 and 206 are unconnected pixels. The remaining pixels are connected pixels.

Returning to FIG. 1, in one embodiment, the motion estimator 104 identifies unconnected pixels in the reference frame to the temporal filtering unit 106, which then performs special handling of the unconnected pixels. Alternatively, the motion estimator 104 identifies the unconnected pixels to the spatial transform unit 110, which then processes them as discussed below.

The temporal filtering unit 106 is responsible for removing temporal redundancies between the frames according to the motion vectors and the identifiers of similar pixels or blocks provided by the motion estimator 104. In one embodiment, the temporal filtering unit 106 produces low-pass and high-pass coefficients for the sets of similar pixels or blocks. In one embodiment, the temporal filtering unit 106 produces low-pass and high-pass coefficients for multiply connected pixels or blocks by jointly transforming a set of multiply connected pixels or blocks using an orthonormal transform (e.g., an orthonormal transformation matrix). In another embodiment, a lifting scheme is used to divide the transformation of multiply connected pixels into two steps: a predict step and an update step. For example, the predict step may involve jointly transforming a set of multiply connected pixels or blocks into high-pass coefficients using an orthonormal transform, and the update step may involve generating one or more low-pass coefficients from one or more reference pixels or blocks and corresponding high-pass coefficients produced at the predict step.

It should be understood that the above-described filtering techniques are not limited to multiply connected pixels or blocks and may be performed for bi-directionally connected pixels, pixels of multiple reference frames, and uni-directionally connected pixels as well.

The spatial transform unit 110 is responsible for reducing spatial redundancies in the frames provided by the MCTF unit 108 using, for example, wavelet transform or discrete cosine transform (DCT). For example, the spatial transform 110 may transform the frames received from the MCTF unit 108 into wavelet coefficients according to a 2D wavelet transform.

In one embodiment, the spatial transform unit 110 is responsible for performing intra-prediction (i.e., prediction from pixels within the frame). Intra-prediction may be performed, for example, for unconnected pixels or blocks, pixels or blocks having predictors both within the frame and outside the frame, etc. In one embodiment, in which intra-prediction is performed for unconnected pixels, the spatial transform unit 110 finds predictors of the unconnected pixels or blocks within the frame being predicted, and performs a joint transformation of the unconnected pixels or blocks and relevant predictors. In one embodiment, the spatial transform unit 110 uses an orthonormal transform (e.g., an orthonormal transformation matrix) to generate residues of the unconnected pixels or blocks.

The entropy encoder 112 is responsible for creating an output bitstream by applying an entropy coding technique to the coefficients received from the spatial transform unit 110. The entropy encoding technique may also be applied to the motion vectors and reference frame numbers provided by the motion estimator 104. This information is included in the output bitstream in order to enable decoding. Examples of a suitable entropy encoding technique may include variable length encoding and arithmetic encoding.

Temporal filtering of multiply connected pixels will now be discussed in more detail in conjunction with FIG. 3.

Figure 3:
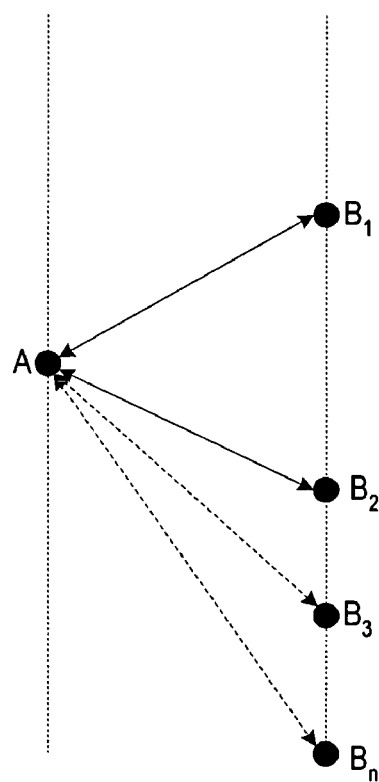
FIG. 3 illustrates exemplary temporal filtering of multiply connected pixels.

Referring to FIG. 3, pixel A in a reference frame is connected to n pixels B1 through Bn. Existing temporal filtering methods typically use the Haar transform to first transform the pair of pixels A and B1 to get a low-pass coefficient L1 and a high-pass coefficient H1. Then, this local transformation is repeated for each pair of A and one of pixels B2 through Bn, producing low-pass coefficients L2 through Ln and high-pass coefficients H2 through Hn, from which low-pass coefficients L2 through Ln are discarded. As a result, a low-pass coefficient L1 and a set of high-pass coefficients H1, H2, . . . Hn are produced for pixels A, B1, B2, . . . Bn. However, this sequential performance of local transformations destroys orthonormality of the transformation, resulting in quantization noise propagation effects at the decoder.

One embodiment of the present invention reduces quantization noise propagation effects in MCTF by performing a joint transformation of the multiply connected pixels (e.g., pixels A, B1, B2, . . . Bn). This joint transformation is performed using an orthonormal transform that may be developed based on the application of an orthonormalization process such as Gram-Schmit orthonormalization process, DCT transform, etc. The orthonormal properties of the transformation eliminate quantization noise propagation effects.

In one embodiment, the orthonormal transform is created on-line. Alternatively, the orthonormal transform is created off-line and stored in a look-up table.

In one embodiment, the orthonormal transform is a transformation matrix of size (n+1)×(n+1), where n is the number of predicted pixels in the predicted frame. The input to the orthonormal transform is the multiply connected pixels (e.g., A, B1, B2, ... Bn) and the output is a low-pass coefficient L1 and high-pass coefficients H1, H2, ... Hn. An exemplary unitary transformation utilizing a 3×3 matrix for multiply connected pixels A, B1 and B2 shown in FIG. 3 may be expressed as follows:

$$\begin{bmatrix} L_1^0 \\ H_1^0 \\ H_2^0 \end{bmatrix} = \begin{bmatrix} \frac{1}{\sqrt{3}} & \frac{1}{\sqrt{3}} & \frac{1}{\sqrt{3}} \\ \frac{2}{\sqrt{6}} & \frac{-1}{\sqrt{6}} & \frac{-1}{\sqrt{6}} \\ 0 & \frac{1}{\sqrt{2}} & \frac{-1}{\sqrt{2}} \end{bmatrix} \begin{bmatrix} A \\ B1 \\ B2 \end{bmatrix} \quad (1)$$

wherein $L_1^0$ is a low-pass coefficient, and $H_1^0$ and $H_2^0$ are high-pass coefficients corresponding to B1 and B2 respectively.

Figure 4:
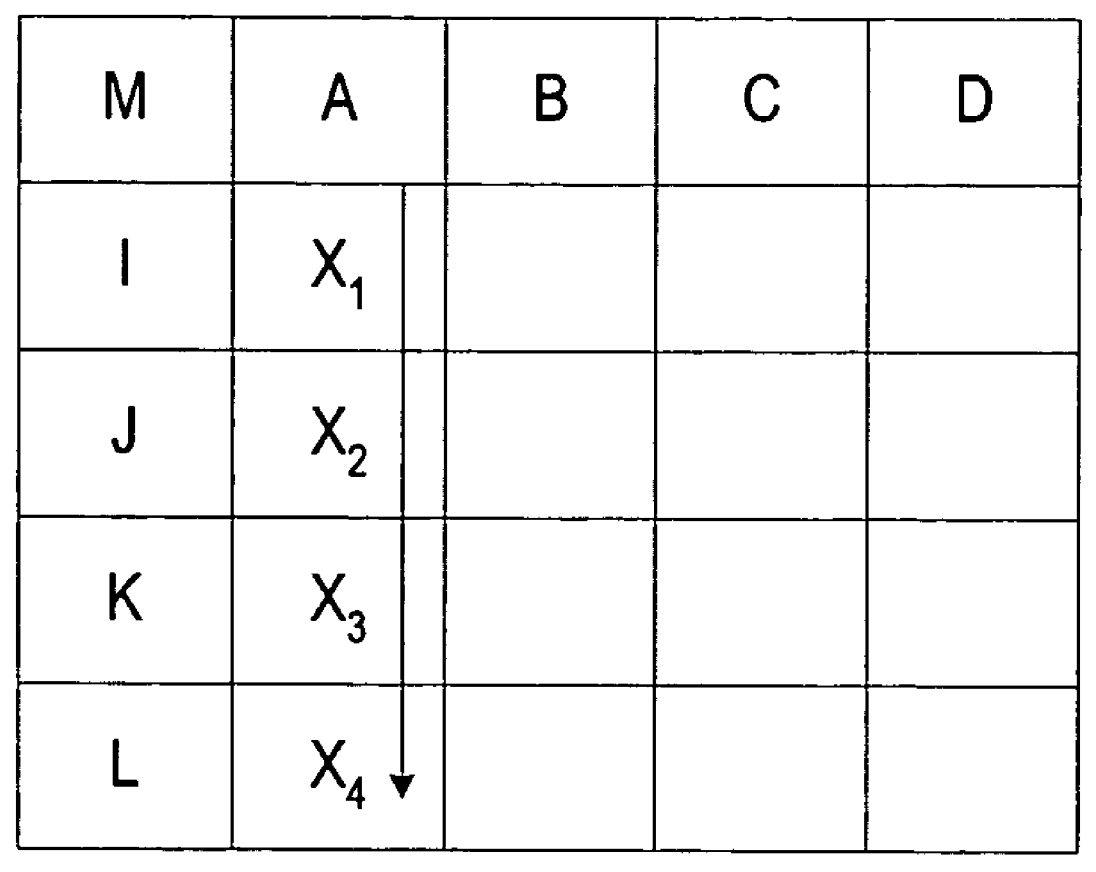

Some pixels or blocks can be predicted using intra-prediction. Intra-prediction may be performed, for example, for unconnected pixels or blocks, pixels or blocks having predictors both within the frame and outside the frame, etc. For example, blocks for which a good predictor from the reference frame cannot be found during MCTF (e.g., by the MCTF unit 108) may be intra-predicted (i.e., predicted from pixels within the frame). FIG. 4 illustrates intra-prediction of pixels that may be performed, for example, by the spatial transformer 110.

Referring to FIG. 4, pixel A is used to predict pixels X1, X2, X3 and X4. The prediction involves replacing the set of pixels (A, X1, X2, X3, X4) with the residues (A, X1-A, X2-A, X3-A, X4-A). Such a prediction does not correspond to an orthonormal transformation of the pixels and, therefore, leads to quantization noise propagation effects at the decoder.

In one embodiment, the set of pixels (A, X1, X2, X3, X4) is jointly transformed into a set of values including an average pixel value and four residue values. This joint transformation is performed using an orthonormal transform that may be developed based on the application of an orthonormalization process such as Gram-Schmit orthonormalization process, DCT transform, etc. The orthonormal properties of the transformation eliminate quantization noise propagation effects.

In one embodiment, the orthonormal transform is created on-line. Alternatively, the orthonormal transform is created off-line and stored in a look-up table.

In one embodiment, the orthonormal transform is a transformation matrix of size (n+1)×(n+1), where n is the number of predicted pixels in the predicted frame. The input to the orthonormal transform includes a predictor A and a set of predicted pixels X1, X2 ... Xn and the output includes an average pixel L and a set of residues R2, R2 ... Rn. An exemplary unitary transformation utilizing a 5×5 matrix for predicted pixels X1 through X4 shown in FIG. 4 may be expressed as follows:

$$\begin{bmatrix} L \\ R_1 \\ R_2 \\ R_3 \\ R_4 \end{bmatrix} = \begin{bmatrix} \frac{1}{\sqrt{5}} & \frac{1}{\sqrt{5}} & \frac{1}{\sqrt{5}} & \frac{1}{\sqrt{5}} & \frac{1}{\sqrt{5}} \\ \frac{-4}{\sqrt{20}} & \frac{1}{\sqrt{20}} & \frac{1}{\sqrt{20}} & \frac{1}{\sqrt{20}} & \frac{1}{\sqrt{20}} \\ 0 & \frac{-3}{\sqrt{12}} & \frac{1}{\sqrt{12}} & \frac{1}{\sqrt{12}} & \frac{1}{\sqrt{12}} \\ 0 & 0 & \frac{-2}{\sqrt{6}} & \frac{1}{\sqrt{6}} & \frac{1}{\sqrt{6}} \\ 0 & 0 & 0 & \frac{-1}{\sqrt{2}} & \frac{1}{\sqrt{2}} \end{bmatrix} \begin{bmatrix} A \\ X_1 \\ X_2 \\ X_3 \\ X_4 \end{bmatrix} \quad (2)$$

wherein L is an average pixel value, and $R_1$ through $R_4$ are residues of pixels $X_1$ through $X_4$ respectively.

Figure 5:
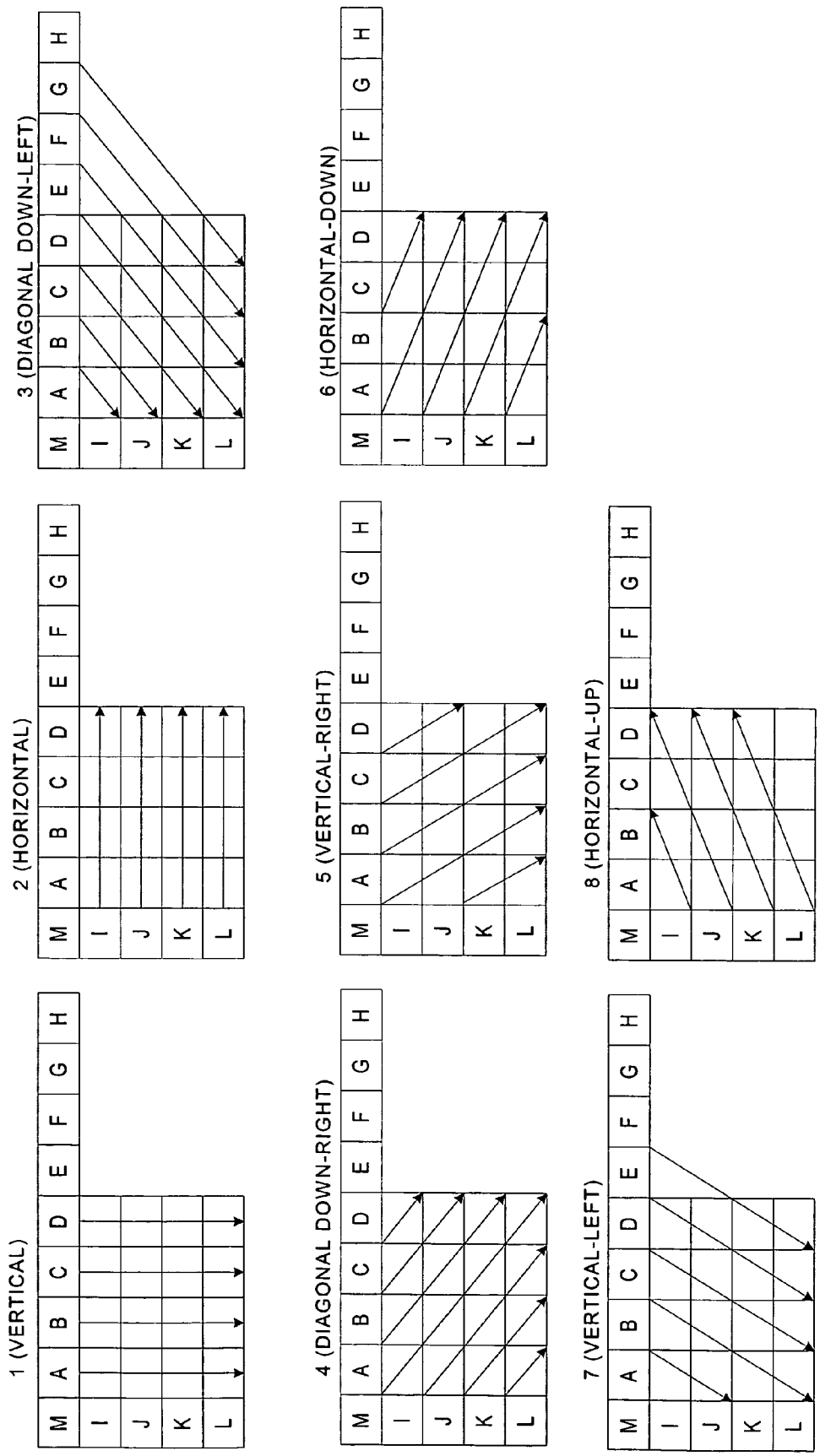
FIG. 5 illustrates exemplary intra-prediction strategies for which orthonormal transformation may be used.

The orthonormal transformation may be used for various intra-prediction strategies, including, for example, vertical prediction, horizontal prediction, diagonal down-left prediction, diagonal down-right prediction, vertical-right prediction, horizontal-down prediction, vertical-left prediction, horizontal-up prediction, etc. FIG. 5 illustrates exemplary intra-prediction strategies for which orthonormal transformation may be used.

The matrix used in the expressions (1) or (2) may be re-written as a general orthonormal transformation matrix of size n, wherein n represents the number of predicted pixels plus 1. An integer version of the general orthonormal transformation matrix of size n may be expressed as follows:

$$T = \begin{bmatrix} 1 & 1 & 1 & 1 & \dots & 1 \\ -(n-1) & 1 & 1 & 1 & \dots & 1 \\ 0 & -(n-2) & 1 & 1 & \dots & 1 \\ 0 & 0 & -(n-3) & 1 & \dots & 1 \\ \vdots & \vdots & & - & - & \vdots \\ \vdots & \vdots & & - & -1 & 1 \end{bmatrix} \quad (3)$$

The corresponding input/output relationship may be provided in the following expression:

$$\begin{bmatrix} L \\ \begin{bmatrix} H1 \\ H2 \\ H3 \\ \vdots \\ \vdots \end{bmatrix} \end{bmatrix} = \begin{bmatrix} 1 & 1 & 1 & 1 & \dots & 1 \\ -(n-1) & 1 & 1 & 1 & \dots & 1 \\ 0 & -(n-2) & 1 & 1 & \dots & 1 \\ 0 & 0 & -(n-3) & 1 & \dots & 1 \\ \vdots & \vdots & & - & - & \vdots \\ \vdots & \vdots & & - & -1 & 1 \end{bmatrix} \begin{bmatrix} P \\ \begin{bmatrix} Y1 \\ Y2 \\ Y3 \\ \vdots \end{bmatrix} \end{bmatrix} \quad (4)$$

wherein P is the predictor (also referred to herein as a reference pixel), pixels (Y1, Y2, Y3, ...) are pixels predicted from P, L is low-pass data (e.g., a low-pass coefficient or an average pixel value) and values (H1, H2, H3, ...) are high-pass data (e.g., high-pass coefficients or residue values) corresponding to the predicted pixels.

In one embodiment, a pixel in a current frame may be predicted using both a predictor from a different frame and a predictor from the current frame. In this embodiment, a combination of spatial and temporal prediction is used to create the residue (high-pass) value, and the decoder is provided with the mode used for prediction. The mode may specify temporal prediction, spatial prediction, or a combination of spatial and temporal prediction. The high-pass residue $H_0$ for a current pixel $C_0$ can be expressed as follows:

$$H_0 = \alpha P_0 + \beta P_1 - C_0 \qquad (5)$$

wherein $P_0$ is the predictor from a different (reference) frame, P1 is the predictor from the same frame, and $\alpha + \beta = 1$, where $\alpha = 1$ for temporal prediction and $\beta = 1$ for intra prediction only.

Figure 6:
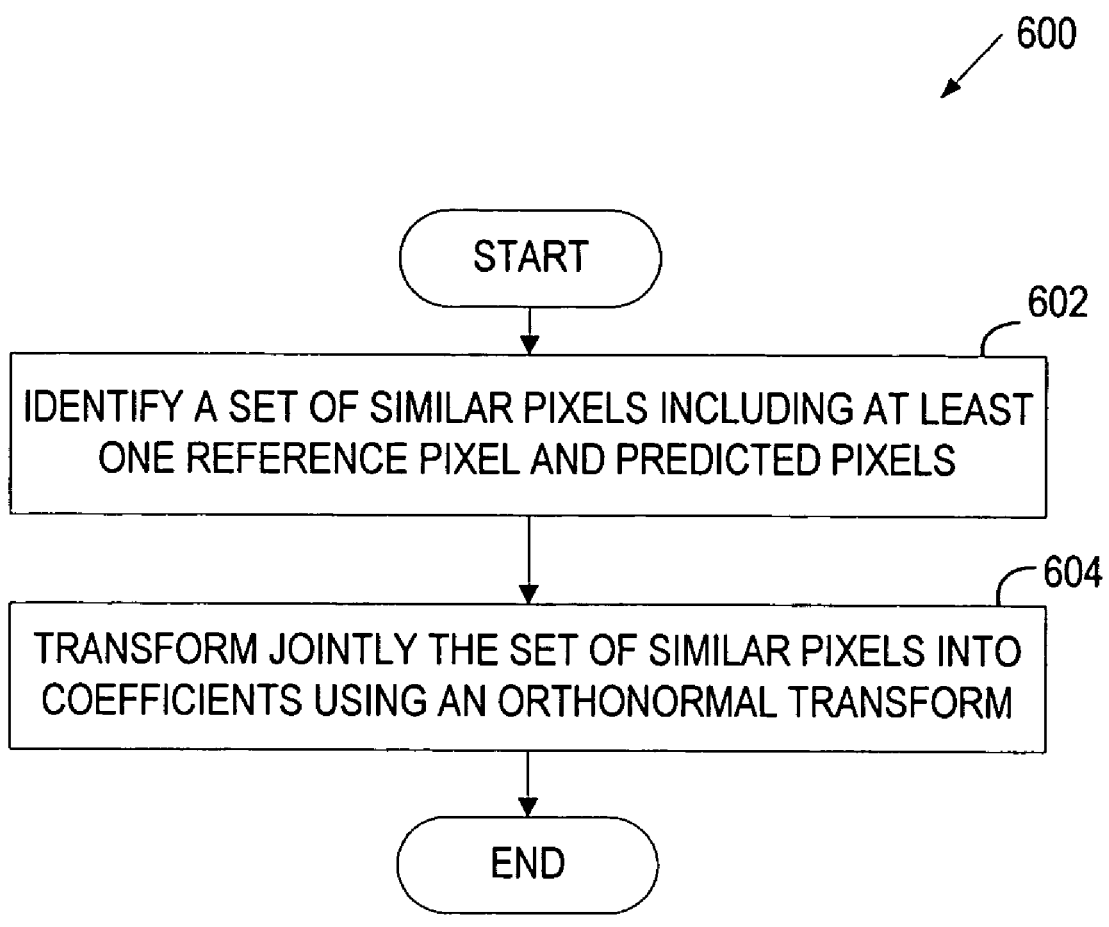
FIG. 6 is a flow diagram of an encoding process utilizing orthonormal transformation, according to some embodiments of the present invention.

FIG. 6 is a flow diagram of an encoding process 600 utilizing orthonormal transformation, according to some embodiments of the present invention. Process 600 may be executed by an MCTF unit 108 or a spatial transform unit 110 of FIG. 1. Process 600 may be performed by processing logic that may comprise hardware (e.g., circuitry, dedicated logic, etc.), software (such as run on a general purpose computer system or a dedicated machine), or a combination of both.

For software-implemented processes, the description of a flow diagram enables one skilled in the art to develop such programs including instructions to carry out the processes on suitably configured computers (the processor of the computer executing the instructions from computer-readable media, including memory). The computer-executable instructions may be written in a computer programming language or may be embodied in firmware logic. If written in a programming language conforming to a recognized standard, such instructions can be executed on a variety of hardware platforms and for interface to a variety of operating systems. In addition, the embodiments of the present invention are not described with reference to any particular programming language. It will be appreciated that a variety of programming languages may be used to implement the teachings described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be appreciated that more or fewer operations may be incorporated into the processes described herein without departing from the scope of the invention and that no particular order is implied by the arrangement of blocks shown and described herein.

Referring to FIG. 6, processing logic begins with identifying a set of similar pixels (processing block 602). The pixels in the set are similar because they consist of a reference pixel and pixels that can be predicted from this reference pixel. In one embodiment, the similar pixels are defined during motion estimation (e.g., by a motion estimator 104) and include multiply connected pixels, wherein the reference pixel is from a first (reference) frame and the predicted pixels are from a second (predicted) frame. In this embodiment, process 600 is performed in the temporal prediction mode.

In another embodiment, the similar pixels are defined during spatial transformation (e.g., by the spatial transform unit 110) and include reference and predicted pixels from the same frame (e.g., in the case of unconnected pixels). In this other embodiment, process 600 is performed in the spatial prediction mode.

At processing block 604, processing logic jointly transforms the set of similar pixels into coefficients using an orthonormal transform. In one embodiment, the orthonormal transform is a transformation matrix of the size $(n+1) \times (n+1)$, wherein n is the number of predicted pixels. In one embodiment, the orthonormal transform is developed using Gram-Schmit orthonormalization process.

In one embodiment, in which process 600 is performed in the temporal prediction mode, the coefficients produced at processing block 604 include a low-pass value and a group of high-pass values corresponding to the predicted values.

In another embodiment, in which process 600 is performed in the spatial prediction mode, the coefficients produced at processing block 604 include an average pixel value and a group of residue values corresponding to the predicted values.

It should be understood that process 600 is not limited to processing of pixels and may be used to process frame regions instead (e.g., in block-based coding schemes such as JVT).

In some embodiments, the orthonormal transformation is performed using a lifting-scheme. Such a lifting-based implementation accomplishes the task of generating low-pass and high-pass data in two steps: the predict step and the update step. In the predict step, high-pass data is generated from reference pixels. In the update step, low-pass data is generated using the reference pixels and the high-pass data. When used in the temporal prediction mode, this lifting-based implementation facilitates a simpler transformation of the inputs to the outputs at the encoder and a simpler recovery of inputs from the outputs at the decoder.

In some embodiments, the lifting-based implementation is used in the spatial prediction mode for intra prediction. This allows for use of multiple pixels as predictors (e.g., using predictors $P_1, \ldots P_m$ for one set of pixels $Y_1, \ldots Y_n$) since the lifting implementation enables creation of corresponding multiple average pixel values and residue values. In addition, the lifting-based implementation provides for the usage of intra prediction across the frame, since it enables the reuse of the predictor block as a predictor for other blocks. Subsequently, at the decoder, the corresponding average pixel values may be recovered from the decoded predictors and the predicted pixels may be recovered using the inverse predict step.

Figure 7:
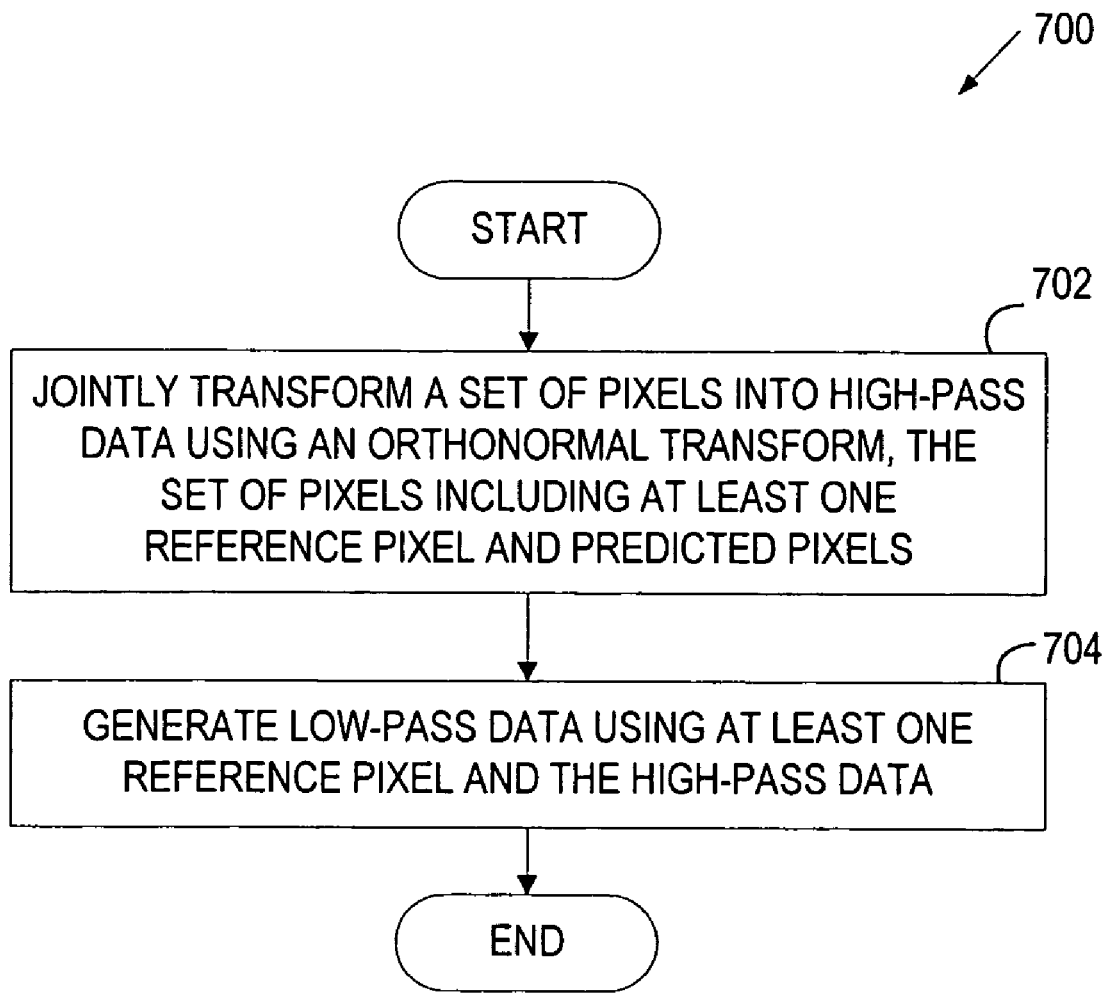
FIG. 7 is a flow diagram of an encoding process utilizing a lifting scheme, according to some embodiments of the present invention.

FIG. 7 is a flow diagram of an encoding process 700 utilizing a lifting scheme, according to some embodiments of the present invention. Process 700 may be executed by an MCTF unit 108 or a spatial transform unit 110 of FIG. 1. Process 700 may be performed by processing logic that may comprise hardware (e.g., circuitry, dedicated logic, etc.), software (such as run on a general purpose computer system or a dedicated machine), or a combination of both.

Referring to FIG. 7, processing logic begins with jointly transforming a set of pixels into high-pass data using an orthonormal transform (processing block 702). The set of pixels includes one or more reference pixels and pixels that can be predicted from the reference pixels. In one embodiment, the set of pixels is defined during motion estimation (e.g., by a motion estimator 104) and includes multiply connected pixels, wherein the reference pixels are from reference frames and the predicted pixels are from a predicted frame. In this embodiment, process 700 is performed in the temporal prediction mode. In one embodiment, motion estimation utilizes a sub-pixel interpolation process.

In another embodiment, the set of pixels is defined during spatial transformation (e.g., by the spatial transform unit 110) and includes reference and predicted pixels from the same frame (e.g., in the case of unconnected pixels). In this other embodiment, process 700 is performed in the spatial prediction mode.

In one embodiment, the orthonormal transform is a transformation matrix of the size $n \times n$, wherein $n = N+1$, with N being the number of predicted pixels. An exemplary orthonormal transform may be expressed as the input/output matrix expression (4) but without the first equation.

In one embodiment, in which process 700 is performed in the temporal prediction mode, the high pass data produced at processing block 702 includes a group of high-pass values corresponding to the predicted values.

In another embodiment, in which process 700 is performed in the spatial prediction mode, the high pass data produced at processing block 604 includes a group of residue values corresponding to the predicted values.

At processing block 704, processing logic generates low-pass data using the reference pixel(s) and the high-pass data. An exemplary expression for generating the low-pass data may be as follows:

$$L = nP + H_1 \quad (6)$$

wherein L may be a low-pass coefficient or an average pixel value, P is a corresponding predictor, and $H_1$ may be a high-pass coefficient corresponding to the first predicted pixel or a residue value corresponding to the first predicted pixel.

Figure 8:
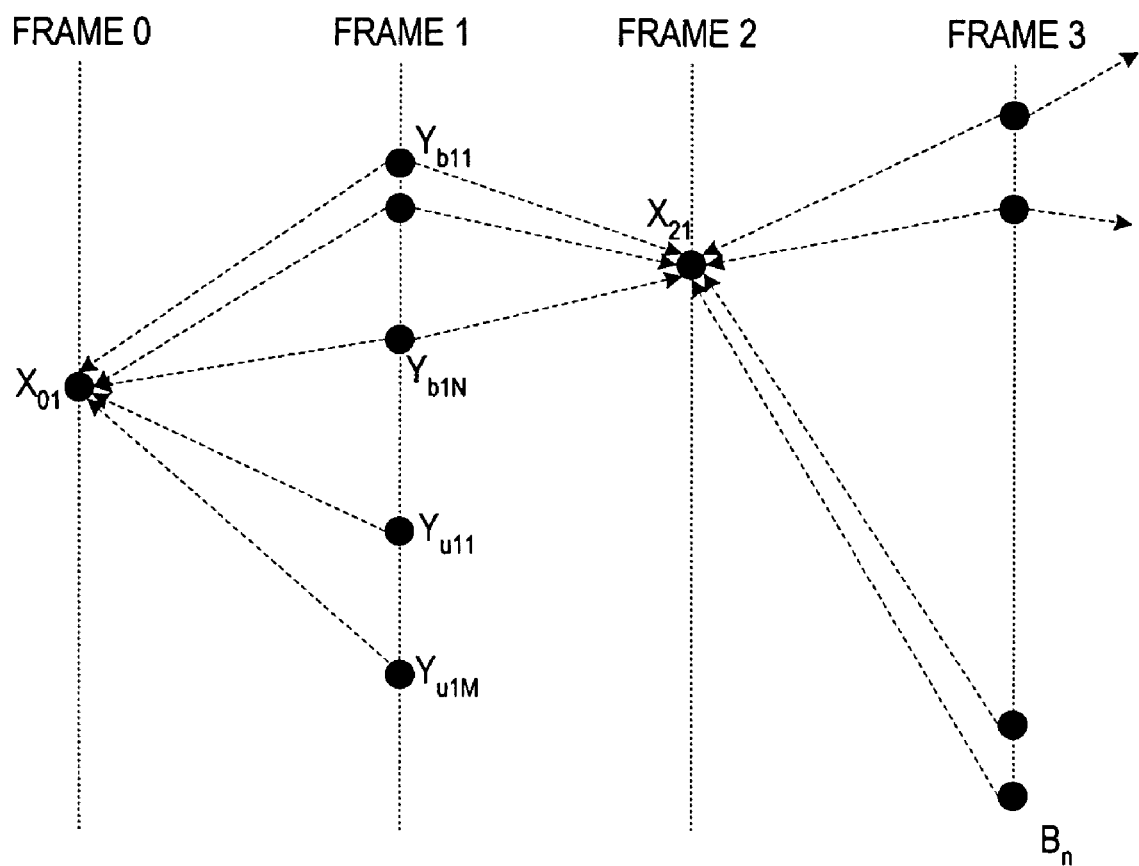
FIG. 8 illustrates an exemplary bi-directional filtering.

In one embodiment, the lifting-based implementation of temporal filtering is used for multiple reference frames and bi-directional filtering. FIG. 8 illustrates an exemplary bi-directional filtering.

Referring to FIG. 8, pixels $Y_{b11}$ through $Y_{b1N}$ are bi-directionally connected to pixels $X_{01}$ and $X_{21}$ (e.g., they are best matched to a weighted combination of $X_{01}$ and $X_{21}$). In addition, pixels $Y_{u11}$ through $Y_{u1M}$ are uni-directionally connected to pixel $X_{01}$. In one embodiment, temporal filtering of pixels in Frame 1 is performed in two steps.

Figure 9:
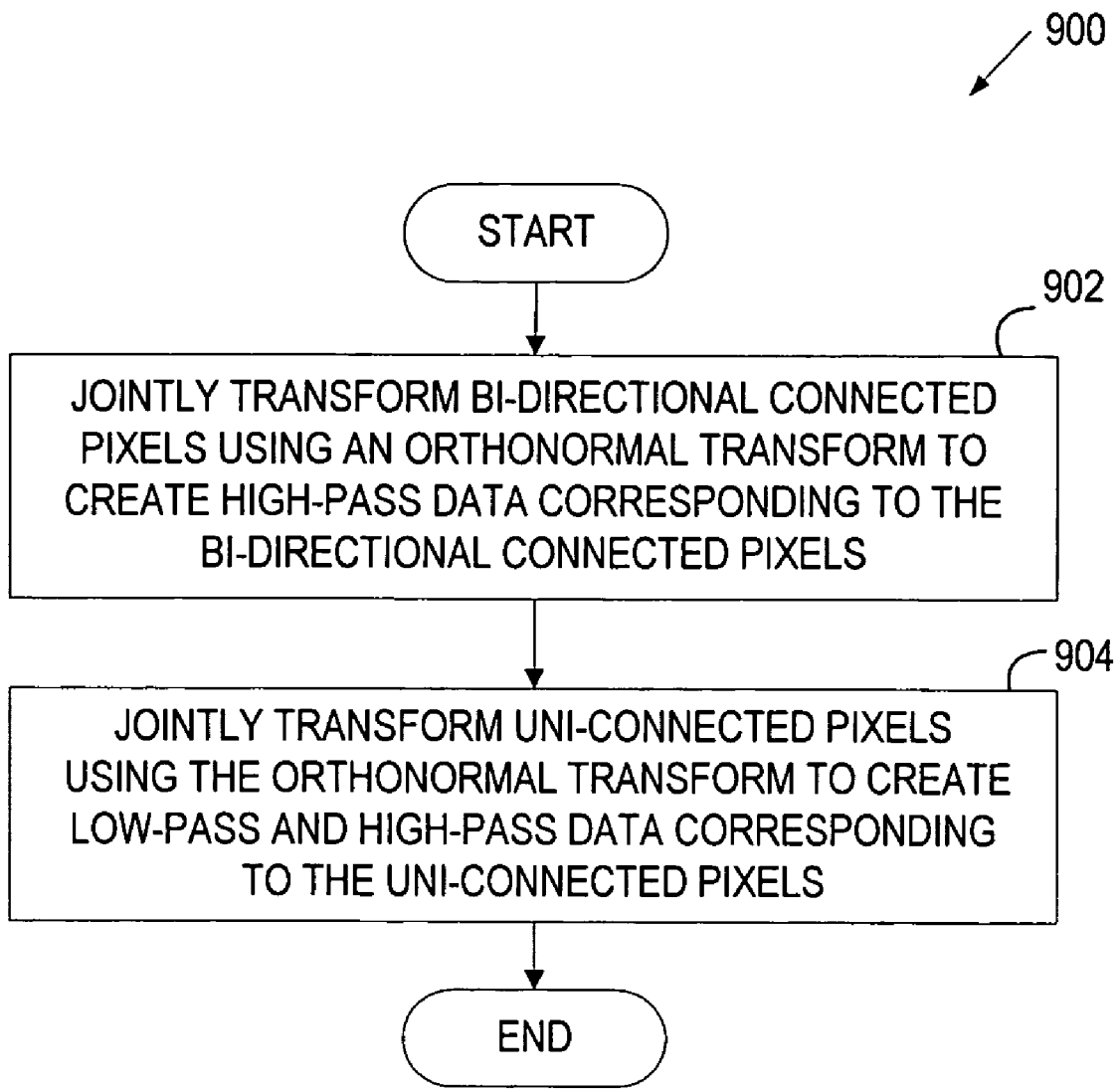
FIG. 9 is a flow diagram of an encoding process utilizing a lifting scheme for bi-directional filtering, according to some embodiments of the present invention.

FIG. 9 is a flow diagram of an encoding process 900 utilizing a lifting scheme for bi-directional filtering, according to some embodiments of the present invention. Process 900 may be executed by an MCTF unit 108 of FIG. 1. Process 900 may be performed by processing logic that may comprise hardware (e.g., circuitry, dedicated logic, etc.), software (such as run on a general purpose computer system or a dedicated machine), or a combination of both.

At processing block 902, processing logic jointly transforms bi-directionally connected pixels using an orthonormal transform to create high pass data, as in the predict step discussed above. For example, the bi-directionally connected pixels $Y_{b11}$ through $Y_{b1N}$ may be jointly transformed to create high-pass coefficients $H_{b11}$ through $H_{b1N}$. An exemplary expression used for such a filtering may be as follows:

$$\begin{bmatrix} L \\ H_{b11} \\ \vdots \\ H_{b1N} \end{bmatrix} = D_N^{-1/2} A_N \begin{bmatrix} \alpha X_{01} + \beta X_{21} \\ Y_{b11} \\ \vdots \\ Y_{b1N} \end{bmatrix} \quad (7)$$

wherein α and β are the weights used for the linear combination of pixels $X_{01}$ and $X_{21}$, and $D_N^{-1/2} A_N$ represents an orthonormal transformation matrix (e.g., matrix T of the expression (3)), with $D_N^{-1/2} A_N$ being a diagonal matrix with entries representing the norm of the rows of matrix $A_N$ (for orthonormality).

In one embodiment, the resulting value L is not transmitted to the decoder and is recovered from the reconstructed pixels $X_{01}$ and $X_{21}$.

Next, processing logic jointly transforms uni-directionally connected pixels using the orthonormal transform to create corresponding low-pass and high-pass data. For example, the uni-directionally connected pixels $Y_{u11}$ through $Y_{u1M}$ may be jointly filtered along with the reference pixel to create the corresponding low-pass value $L_{01}$ and high-pass values $H_{u11}$ through $H_{u1M}$. An exemplary expression used for such a filtering may be as follows:

$$\begin{bmatrix} L_{01} \\ H_{u11} \\ \vdots \\ H_{u1M} \end{bmatrix} = D_M^{-1/2} A_M \begin{bmatrix} X_{01} \\ Y_{u11} \\ \vdots \\ Y_{u1M} \end{bmatrix} \quad (8)$$

In one embodiment, the decoder uses an inverted process: first the values $H_{u11}$ through $H_{u1M}$ and $L_{01}$, corresponding to the uni-directionally connected pixels, are inverse filtered to recover $X_{01}$ and $Y_{u11}$ through $Y_{u1M}$, and then the bi-directionally connected pixels $Y_{b11}$ through $Y_{b1N}$ may be recovered using the inverse predict step.

It should understood by one of ordinary skill in the art that process 900 is not limited to bi-directional filtering and may be used for multiple reference frames without loss of generality.

Figure 10:
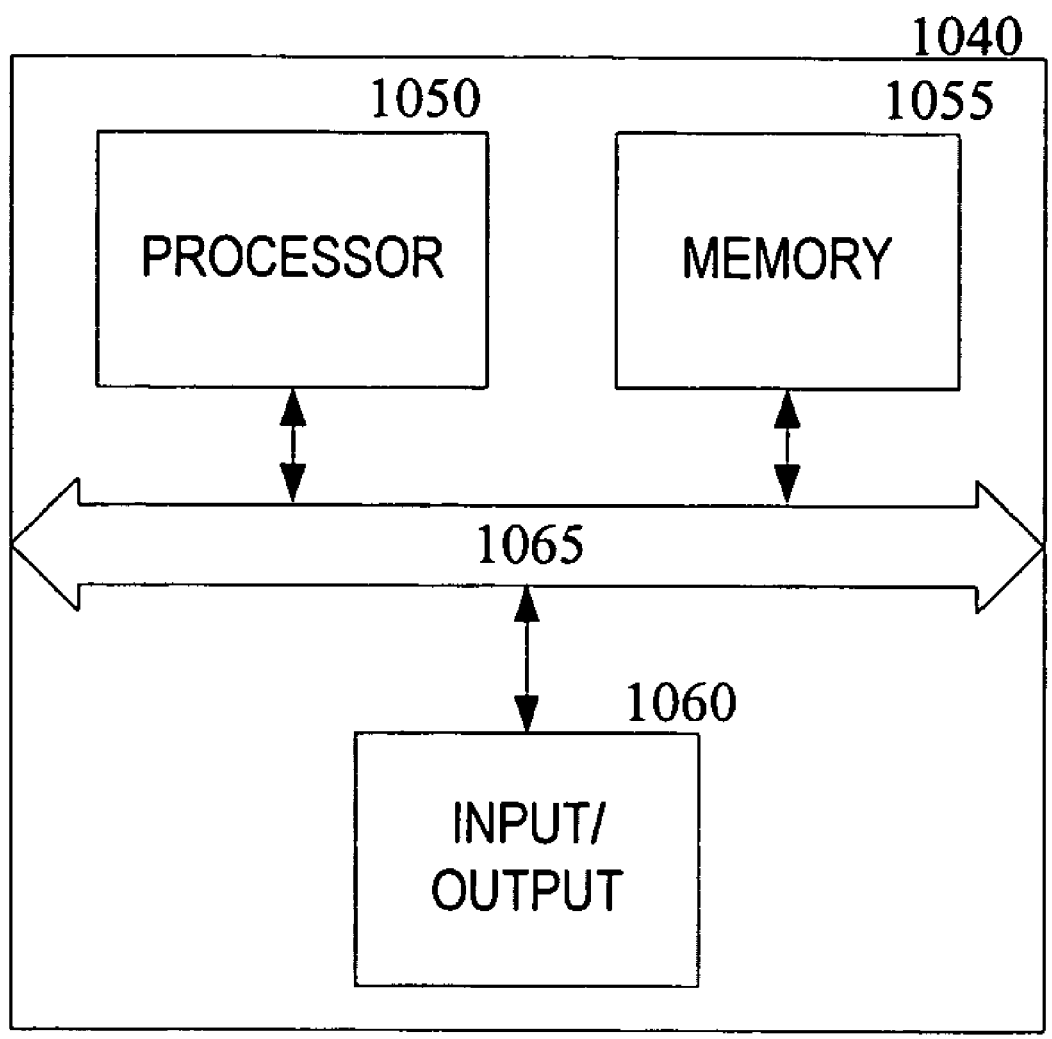
FIG. 10 is a block diagram of a computer environment suitable for practicing embodiments of the present invention.

The following description of FIG. 10 is intended to provide an overview of computer hardware and other operating components suitable for implementing the invention, but is not intended to limit the applicable environments. FIG. 10 illustrates one embodiment of a computer system suitable for use as an encoding system 100 or just an MCTF unit 108 or a spatial transform unit 110 of FIG. 1.

The computer system 1040 includes a processor 1050, memory 1055 and input/output capability 1060 coupled to a system bus 1065. The memory 1055 is configured to store instructions which, when executed by the processor 1050, perform the methods described herein. Input/output 1060 also encompasses various types of computer-readable media, including any type of storage device that is accessible by the processor 1050. It will also be appreciated that the system 1040 is controlled by operating system software executing in memory 1055. Input/output and related media 1060 store the computer-executable instructions for the operating system and methods of the present invention. The MCTF unit 108 or the spatial transform unit 110 shown in FIG. 1 may be a separate component coupled to the processor 1050, or may be embodied in computer-executable instructions executed by the processor 1050. In one embodiment, the computer system 1040 may be part of, or coupled to, an ISP (Internet Service Provider) through input/output 1060 to transmit or receive image data over the Internet. It is readily apparent that the present invention is not limited to Internet access and Internet web-based sites; directly coupled and private networks are also contemplated.

It will be appreciated that the computer system 1040 is one example of many possible computer systems that have different architectures. A typical computer system will usually include at least a processor, memory, and a bus coupling the memory to the processor. One of skill in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Various aspects of selecting optimal scale factors have been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

What is claimed is:

1. A computerized encoding method comprising:

jointly transforming a plurality of bi-directionally connected pixels using an orthonormal transform to create high-pass data corresponding to the plurality of bi-directionally connected pixels, the plurality of bi-directionally connected pixels including reference pixels from reference frames and a first set of predicted pixels from a predicted frame; and jointly transforming a plurality of uni-directionally connected pixels using the orthonormal transform to create low-pass and high-pass data corresponding to the plurality of uni-directionally connected pixels, the plurality of uni-directionally connected pixels including one of the reference pixels and a second set of predicted pixels from the predicted frame.

2. The method of claim 1 wherein the plurality of bi-directionally connected pixels and the plurality of uni-directionally connected pixels are defined by a motion estimation process.

3. The method of claim 1 wherein the high-pass data comprises a set of high-pass coefficients and the low-pass data comprises a low-pass coefficient.

4. The method of claim 1 wherein the orthonormal transform is a transformation matrix.

5. A computer readable storage medium that stores executable instructions, which when executed on a processor cause the processor to perform a method comprising:

jointly transforming a plurality of bi-directionally connected pixels using an orthonormal transform to create high-pass data corresponding to the plurality of bi-directionally connected pixels, the plurality of bi-directionally connected pixels including reference pixels from reference frames and a first set of predicted pixels from a predicted frame; and jointly transforming a plurality of uni-directionally connected pixels using the orthonormal transform to create low-pass and high-pass data corresponding to the plurality of uni-directionally connected pixels, the plurality of uni-directionally connected pixels including one of the reference pixels and a second set of predicted pixels from the predicted frame.

6. The computer readable storage medium of claim 5 wherein the plurality of bi-directionally connected pixels and the plurality of uni-directionally connected pixels are defined by a motion estimation process.

7. The computer readable storage medium of claim 5 wherein the high-pass data comprises a set of high-pass coefficients and the low-pass data comprises a low-pass coefficient.

8. The computer readable storage medium of claim 5 wherein the orthonormal transform is a transformation matrix.

9. A computerized system comprising: a memory; and at least one processor coupled to the memory, the at least one processor executing a set of instructions which cause the at least one processor to jointly transform a plurality of bi-directionally connected pixels using an orthonormal transform to create high-pass data corresponding to the plurality of bi-directionally connected pixels, the plurality of bi-directionally connected pixels including reference pixels from reference frames and a first set of predicted pixels from a predicted frame; and jointly transform a plurality of uni-directionally connected pixels using the orthonormal transfonn to create low-pass and high-pass data corresponding to the plurality of uni-directionally connected pixels, the plurality of uni-directionally connected pixels including one of the reference pixels and a second set of predicted pixels from the predicted frame.

10. The system of claim 9 wherein the plurality of bi-directionally connected pixels and the plurality of uni-directionally connecied pixels are defined by a motion estimation process.

11. The system of claim 9 wherein the high-pass data comprises a set of high-pass coefficients and the low-pass data comprises a lowpass coefficient.

12. The system of claim 9 wherein the orthonormal transform is a transformation matrix.

13. An encoding apparatus comprising:

means for jointly transforming a plurality of bi-directionally connected pixels using an orthonormal transform to create high-pass data corresponding to the plurality of bi-directionally connected pixels, the plurality of bi-directionally connected pixels including reference pixels from reference frames and a first set of predicted pixels from a predicted frame; and means for jointly transforming a plurality of uni-directionally connected pixels using the orthonormal transform to create low-pass and high-pass data corresponding to the plurality of uni-directionally connected pixels, the plurality of uni-directionally connected pixels including one of the reference pixels and a second set of predicted pixels from the predicted frame.

* * * * *